Patented Feb. 13, 1923.

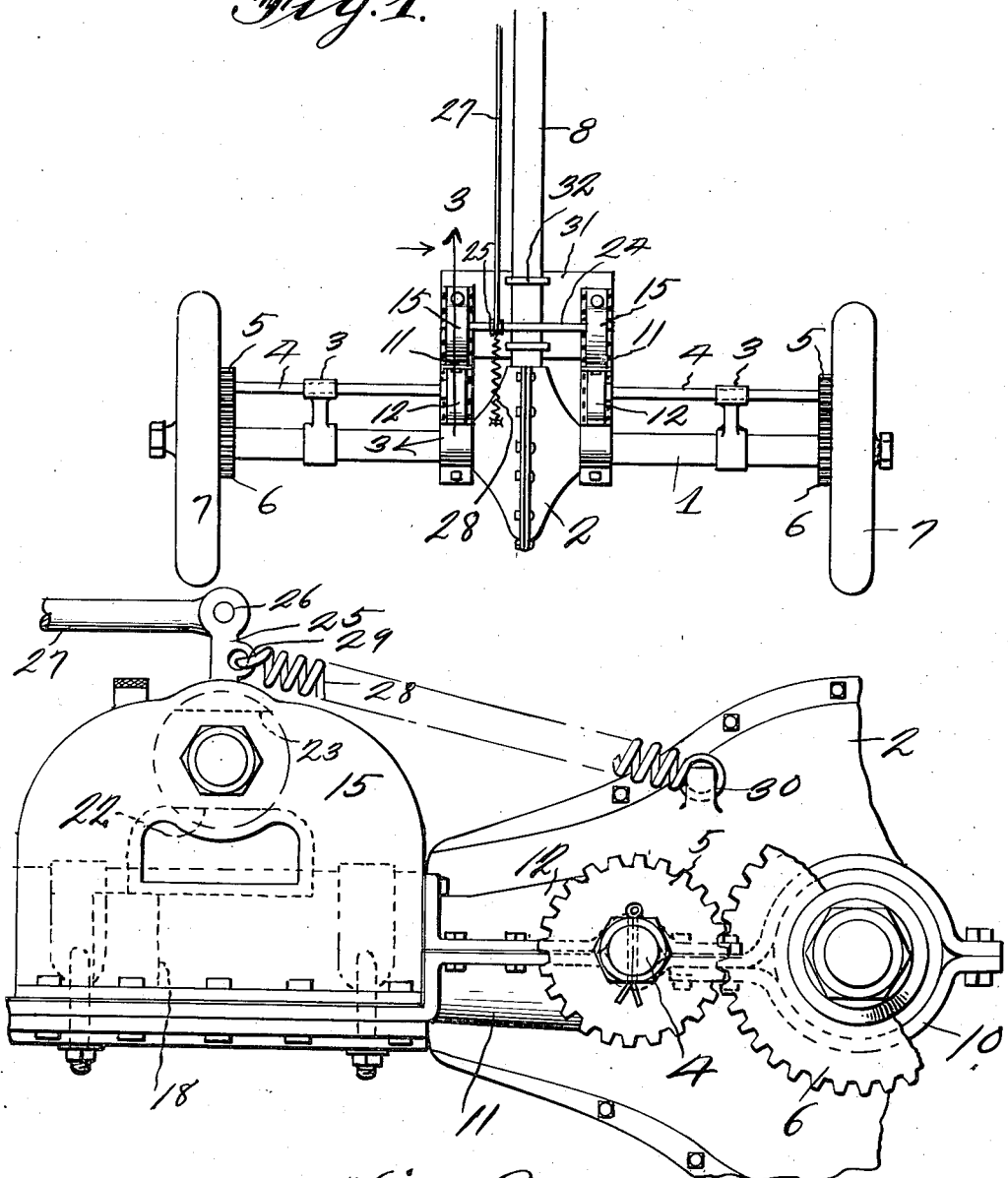

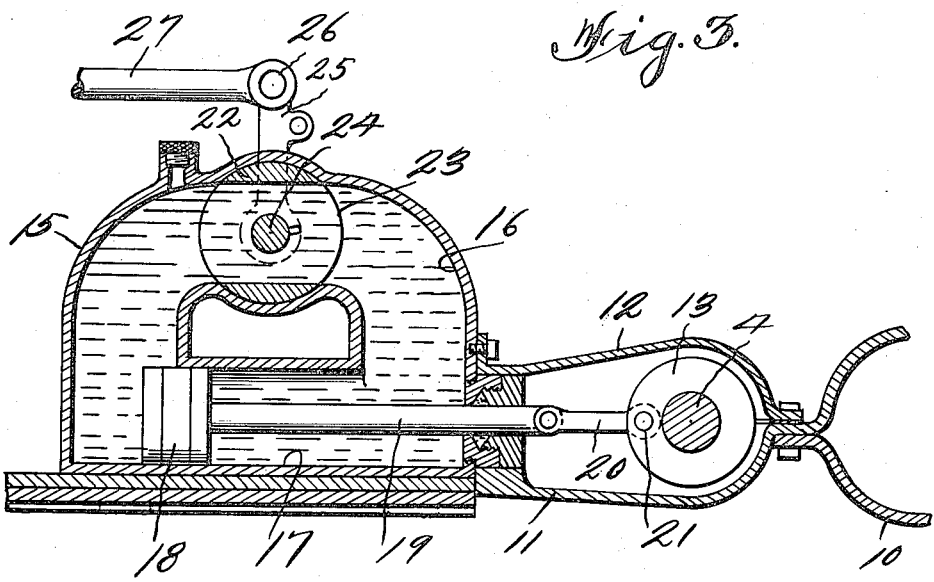
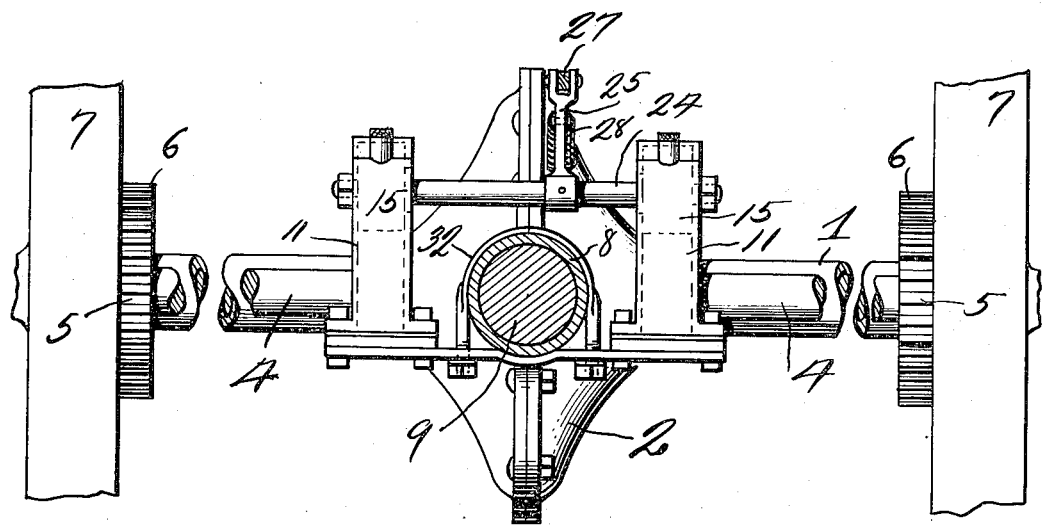

1,445,170

UNITED STATES PATENT OFFICE.

ERNEST A. RAREY, OF KELSO, WASHINGTON.

BRAKE.

Application filed January 31, 1922. Serial No. 532,952.

*To all whom it may concern:*

Be it known that I, ERNEST A. RAREY, a citizen of the United States, residing at Kelso, in the county of Cowlitz, State of Washington, have invented a new and useful Brake; and I do hereby declare the following to be a full, clear, and exact description of the invention, such as will enable others skilled in the art to which it appertains to make and use the same.

The invention relates to brakes, and has for its object to provide in combination with the rear axle of an automobile, a fluid brake so constructed that when a valve is rotated the fluid will be held against movement and a piston held in such a manner that it will hold the rear axle against rotation.

A further object is to provide in combination with the rear axle of an automobile having a differential disposed in a casing and an axle disposed within a casing, of a fluid brake therefor, said brake comprising casings secured to the axle casing at each side of the differential casing, shafts rotatably mounted in bearings of the casings and having discs within the casings, the outer ends of said shafts having gear connections with the wheels. The discs are provided with connecting rod connections with piston rods, said piston rods being provided with pistons slidably mounted in the lower portions of endless oil chambers disposed in the casings and to provide a rock shaft having valves on its ends which may be rocked for simultaneously opening or closing the valves which are disposed within the endless oil chambers, and forming means for preventing the flow of oil within the chambers and consequently holding the pistons against movement.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a top plan view of the rear axle of the motor driven vehicle, showing the brake applied thereto.

Figure 2 is an enlarged side elevation of the brake mechanism and a portion of the differential.

Figure 3 is an enlarged sectional view through one of the brake casings taken on line 3—3 of Figure 1.

Figure 4 is a front elevation of the axle casing and the brake mechanism.

Referring to the drawings, the numeral 1 designates the rear axle casing of an automobile and 2 the differential casing carried thereby. Secured to the axle casing 1 at each side of the differential casing 2 are forwardly extending brackets 3, in which brackets are rotatably mounted brake shafts 4. The outer ends of the brake shafts 4 are provided with pinions 5 which mesh with gears 6 carried by the wheels 7 of the vehicle. Extending forwardly from the differential casing 2 is a drive shaft casing 8, in which casing the drive shaft 9 is housed and rotates, said drive shaft 9 operating a differential in the usual manner. Clamped to the axle 1 by means of segmentally shaped plates 10 at each side of the differential casing 2 are forwardly extended casings 11, in the portions 12 of which the inner ends of the shafts 4 are rotatably mounted, said shafts being provided with discs 13 disposed within chambers 14 of the casings 12. The forward portions 15 of the casings 11 are provided with endless chambers 16, in the lower portions 17 of which pistons 18 are mounted and reciprocate when the brake shafts 4 rotate through the piston rod 19 and connecting rod 20 connecting the piston rods 19 to the discs 13 as at 21. It will be seen that as the wheels 7 move over the ground that the pistons 18 will be reciprocated within the portions 17 of the endless passages, which passages are filled with oil and that when the valves 22 are in the position shown in Figure 3 that the oil will flow freely through the ports 23 thereby allowing freedom of movement of the pistons 18. When it is desired to apply a braking action to the rear axles, the valve rod 24 is rocked thereby rocking the valves 22 and preventing flow of oil in either direction in the endless chambers 16, therefore it will be seen that the pistons 18 will compress the oil to either side thereof and consequently cause a braking action to take place and the wheels to be held against rotation.

Extending upwardly from the valve shaft 24 is an arm 25, to the upper end of which is pivotally connected at 26 a controlling rod 27. The controlling rod 27 may lead to any part of the vehicle and may be controlled in any suitable manner preferably through the medium of a foot lever within easy reach of the operator. The arm 25 is normally held in rearward position by the coil spring 28, which spring is connected at 29 to the arm 25 and at 30 to the differential casing 2 and is sufficiently tensioned to normally maintain the valves 22 in the position shown in Figure 3.

From the above it will be seen that a fluid brake is provided for motor driven vehicles, which brake is simple in construction and so constructed that it may be applied to various types of vehicles now in use. The forward end of the casings 11 are supported on a transversely disposed plate 31, which plate is in turn supported by a U-shaped member 32 which arches the drive shaft casing 8.

The invention having been set forth what is claimed as new and useful—

1. The combination with a rear axle of an automobile, said axle being rotatably mounted in a casing and controlled through a differential driven by a shaft rotatably mounted in a casing, of a brake mechanism for said axle, said brake mechanism comprising forwardly extending casings carried by the axle casing at each side of the differential, wheels carried by the ends of said axle, gear connections between said wheels and inwardly extending shafts, fluid brake devices disposed in the forwardly extending casings, valve means carried by said casings for controlling the movement of the fluid brake devices, said fluid brake devices normally moving with and connected to the inner ends of the inwardly extending shafts.

2. The combination with a rear axle of an automobile, said axle being rotatably mounted in a casing and controlled through a differential driven by a shaft rotatably mounted in the casing, of fluid brake mechanisms disposed in casings, the rear ends of said casings being supported on the axle casing at each side of the differential, the forward ends of said casings in which the brake mechanisms are disposed and supported by the drive shaft casing, shafts rotatably mounted in bearings and in parallel relations to the axle, gear connections between the outer ends of the shafts and wheels carried by the axle, said shafts being connected to the brake mechanism and constantly moving controllable pistons therein, and means whereby the fluid brake mechanisms may be simultaneously controlled.

In testimony whereof I have signed my name to this specification in the presence of two subscribing witnesses.

ERNEST A. RAREY.

Witnesses:
ALBAN D. TRACEY,
REBECCO J. TRACEY.